United States Patent
Won (10) Patent No.: US 6,732,550 B2
(45) Date of Patent: May 11, 2004

(54) METHOD FOR PERFORMING A DEEP TRENCH ETCH FOR A PLANAR LIGHTWAVE CIRCUIT

(75) Inventor: Jongik Won, Pleasanton, CA (US)

(73) Assignee: Lightwave Microsystems, Inc., San Jose, CA (US)

( * ) Notice: Subject to any disclaimer, the term of this patent is extended or adjusted under 35 U.S.C. 154(b) by 240 days.

(21) Appl. No.: 09/948,486

(22) Filed: Sep. 6, 2001

(65) Prior Publication Data

US 2003/0041624 A1 Mar. 6, 2003

(51) Int. Cl.[7] .................. C03C 15/00; H01L 21/302
(52) U.S. Cl. .................. 65/386; 438/694; 438/200; 438/702
(58) Field of Search .................. 65/386, 413; 438/694, 438/700, 703, 740; 385/129, 130, 131, 132, 702

(56) References Cited

U.S. PATENT DOCUMENTS

| | | | | |
|---|---|---|---|---|
| 4,820,655 A | * | 4/1989 | Noda et al. ............... 438/24 |
| 5,130,268 A | * | 7/1992 | Liou et al. ............... 438/425 |
| 5,393,375 A | * | 2/1995 | MacDonald et al. ...... 216/2 |
| 5,410,176 A | * | 4/1995 | Liou et al. ............... 257/49 |
| 5,445,988 A | * | 8/1995 | Schwalke ............... 438/432 |
| 5,471,552 A | | 11/1995 | Wuu ...................... 385/49 |
| 5,500,916 A | * | 3/1996 | Cirelli et al. ............ 385/37 |
| 5,533,156 A | | 7/1996 | Maxwell ................. 385/49 |
| 5,587,090 A | * | 12/1996 | Belcher et al. .......... 216/17 |
| 5,628,917 A | | 5/1997 | MacDonald ............. 216/2 |
| 5,719,073 A | * | 2/1998 | Shaw et al. ............. 438/53 |
| 5,783,468 A | * | 7/1998 | Zhang et al. ........... 438/166 |
| 5,796,902 A | | 8/1998 | Bhat ..................... 385/122 |
| 5,802,232 A | | 9/1998 | Bhat ..................... 385/122 |
| 5,815,615 A | | 9/1998 | Taneya .................. 385/50 |
| 5,838,854 A | | 11/1998 | Taneya .................. 385/50 |
| 5,841,930 A | | 11/1998 | Kovacic ................. 385/131 |
| 5,846,849 A | * | 12/1998 | Shaw et al. ............. 438/52 |
| 5,885,881 A | * | 3/1999 | Ojha ..................... 438/381 |
| 5,904,491 A | * | 5/1999 | Ojha et al. ............. 438/31 |
| 5,915,051 A | * | 6/1999 | Damask et al. .......... 385/16 |
| 5,917,981 A | | 6/1999 | Kovacic ................. 385/131 |
| 5,940,548 A | | 8/1999 | Yamada ................. 385/14 |
| 5,952,723 A | | 9/1999 | Takeyasu ............... 257/771 |
| 5,987,196 A | * | 11/1999 | Noble .................... 385/14 |
| 6,022,671 A | | 2/2000 | Binkley ................. 430/321 |
| 6,044,192 A | * | 3/2000 | Grant et al. ............ 385/129 |

(List continued on next page.)

Primary Examiner—Steven P. Griffin
Assistant Examiner—Carlos Lopez (57) ABSTRACT

A method of making an optical waveguide structure having improved thermal isolation and stress reduction. The method etches both deep trenches and shallow trenches in a single step. The method includes the step of depositing a partial top clad layer over a first and second waveguide core. An etch back is then performed on the partial top clad layer to obtain a desired thickness of the partial top clad layer. A first hard mask layer is subsequently deposited over the partial top clad layer. A set of hard masks are then formed over the first and second waveguide cores by patterning and etching the first hard mask layer. A full top clad layer is then deposited over the partial top clad layer and the set hard masks to form a top clad. A second hard mask layer is then deposited over the top clad. A deep trench area and first and second shallow trench areas are then exposed by patterning and etching the second hard mask layer. The deep trench area and the first and second shallow trench areas are then simultaneously etched to form a deep trench extending from the upper surface of the top clad to an underlying substrate, and first and second shallow trenches extending from the upper surface of the top clad to the set of hard masks. The set of hard masks and the second hard mask layer are then removed. Reactive ion etching can be used to etch the first and second hard mask layers. The hard mask layers can be amorphous silicon.

9 Claims, 7 Drawing Sheets

Etching shallow and deep trench at the same time using RIE

U.S. PATENT DOCUMENTS

| | | | |
|---|---|---|---|
| 6,140,208 A | * 10/2000 | Agahi et al. | 438/437 |
| 6,144,779 A | 11/2000 | Binkley | 385/8 |
| 6,190,928 B1 | * 2/2001 | Lo et al. | 438/14 |
| 6,208,791 B1 | 3/2001 | Bischel | 385/129 |
| 6,466,722 B1 | * 10/2002 | Fujiwara et al. | 385/130 |
| 6,542,687 B2 | * 4/2003 | Won et al. | 385/132 |
| 6,553,170 B2 | * 4/2003 | Zhong et al. | 385/130 |
| 6,573,154 B1 | * 6/2003 | Sridhar et al. | 438/430 |
| 6,628,876 B1 | * 9/2003 | Shmulovich | 385/129 |

* cited by examiner

Fig. 1 Core Formation on Bottom Clad

Fig. 2 Passivation (un-doped SiO2) layer deposition

Fig. 3 Partial TC (doped SiO2) deposition

Fig. 4 Etch-back for optimum passivation thickness control by RIE process

Fig. 5 First hard mask-layer (a-Si) deposition

Fig. 6 Patterning first hard-mask layer with photo-resist

Fig. 7 Etching first hard-mask layer using RIE and stripping photo-resist

Fig. 8  Top Clad deposition

Fig. 9  Passivation layer (un-doped SiO2) deposition

Fig. 10  Second hard-mask (a-Si) deposition

Fig. 11 Patterning Second hard-mask layer with photo-resist

Fig. 12 Etching second hard-mask layer using RIE and stripping photo-resist

Fig. 13 Etching shallow and deep trench at the same time using RIE

Fig. 14 Striping first and second hard-mask layers using dry/wet etch

METHOD FOR PERFORMING A DEEP TRENCH ETCH FOR A PLANAR LIGHTWAVE CIRCUIT

FIELD OF THE INVENTION

The present invention relates generally to planar lightwave circuits. More particularly, the present invention relates to a method and system for performing deep trench etching in a planar lightwave circuit for stress relief and thermal isolation, and other applications.

BACKGROUND OF THE INVENTION

Planar lightwave circuits comprise fundamental building blocks for the newly emerging, modern fiberoptic communications infrastructure. Planar lightwave circuits are innovative devices configured to transmit light in a manner analogous to the transmission of electrical currents in printed circuit boards and integrated circuit devices. Examples include arrayed waveguide grating devices, integrated wavelength multiplexers/demultiplexers, optical switches, optical modulators, wavelength-independent optical couplers, and the like.

Planar lightwave circuits (PLCs) generally involve the provisioning of a series of embedded optical waveguides upon a semiconductor substrate (e.g., silicon). PLCs are constructed using the advanced tools and technologies developed by the semiconductor industry. Modern semiconductor electronics fabrication technology can aggressively address the increasing need for integration and is currently being used to make planar lightwave circuits. By using manufacturing techniques closely related to those employed for silicon integrated circuits, a variety of optical elements can be placed and interconnected on the surface of a silicon wafer or similar substrate. This technology has only recently emerged and is advancing rapidly with leverage from the more mature tools of the semiconductor-processing industry.

A conventional PLC optical waveguide comprises a substrate (e.g., silicon) with a un-doped silica glass bottom clad formed thereon, at least one waveguide core formed on the bottom clad, and a top clad covering the waveguide core and the bottom clad, wherein a certain amount of at least one dopant is added to the waveguide core so that the refractive index of the waveguide core is higher than that of the top clad and bottom clad. The waveguide cores are formed by etching their profile from a core layer (e.g., doped $SiO_2$ glass) deposited over the bottom clad. The core layer is patterned by, for example, reactive-ion etching to remove the excess doped $SiO_2$ glass, and thereby define the profile of one or more waveguide cores. An $SiO_2$ top clad layer is then formed (e.g., by flame deposition or PECVD). The optical waveguide is subsequently heated to a certain temperature to stabilize the refractive index of the top clad and to make the top clad more homogenous. Finally, the wafer is diced into multiple PLC dies and packaged according to their particular applications.

A well-known problem with many planar lightwave circuits is the polarization sensitivity of the devices. Polarization sensitivity is a problem for both active PLC devices and passive PLC devices. For example, with many PLC devices, such as arrayed waveguide grating (AWG) devices, Mach-Zehnder thermo-optic devices, and the like, the switching/routing components of the devices must be substantially polarization insensitive. However, the presence of stress within the silica layers and the substrates of the devices causes different propagation constants for TE (transverse electric) and TM (transverse magnetic) propagation modes, typically referred to as birefringence. Birefringence and polarization sensitivity tends to be more problematic with active PLC devices, particularly thermo-optic PLC devices, where thermally induced birefringence exists in addition to any "intrinsic" birefringence of the PLC waveguides.

There exists an additional problem, with respect to thermal isolation. In active thermo-optic PLC devices, heat applied to one waveguide core needs to be thermally isolated from adjacent waveguide cores within the same device. Thermo-optic devices rely upon the selective heating of the silica waveguides to modulate the refractive index of the individual waveguides. This heat is used to precisely control the phase difference between light propagating along adjacent waveguides. Accordingly, one waveguide needs to be heated in a very controlled manner with respect to an adjacent waveguide. Unfortunately, due to the nature of transmission of thermal energy through the silica comprising the waveguides, thermal isolation between adjacent waveguides can be problematic.

An additional problem with active thermo-optic PLC devices is the fact that the heat used to modulate the phase of light propagating through the waveguides also induces stress (e.g., due to different coefficients of thermal expansion of the core, top clad, bottom clad, etc.) within the structure of the waveguides. This stress produces the different propagation constants for TE (transverse electric) and TM (transverse magnetic) propagation modes, and thus, the birefringence. This mismatch can cause a polarization dependent loss, wherein either the TE or TM mode is attenuated within the optical waveguide structures to a greater degree than the other, and other types of problems.

Thus, what is required is a solution that minimizes thermally induced birefringence within thermo-optic PLC devices. What is required is a solution that improves thermal isolation between adjacent waveguides of an active thermo-optic PLC device. Additionally, the required solution should be compatible with widely used PLC fabrication methods. The present invention provides a novel solution to the above requirements.

SUMMARY OF THE INVENTION

The present invention provides a solution that minimizes thermally induced dn/dt birefringence within thermal optic PLC devices. The present invention provides a solution that improves thermal isolation between adjacent thermal optic waveguides of an active PLC device. Additionally, the process of the present invention is compatible with widely used PLC fabrication methods.

In one embodiment, the present invention is implemented as a deep trench etching process for making an optical waveguide structure having improved thermal isolation and stress reduction. The method etches both deep trenches and shallow trenches in a single step. The method includes the step of depositing a partial top clad layer over a first and second waveguide core. An etch back is then performed on the partial top clad layer to obtain a desired thickness of the partial top clad layer. A first hard mask layer is subsequently deposited over the partial top clad layer. A set of hard masks are then formed over the first and second waveguide cores by patterning and etching the first hard mask layer. A full top clad layer is then deposited over the partial top clad layer and the set hard masks to form a top clad. A second hard mask layer is then deposited over the top clad. A deep trench area and first and second shallow trench areas are then exposed by patterning and etching the second hard mask layer. The deep trench area and the first and second shallow trench areas are then simultaneously etched to form a deep trench extending from the upper surface of the top clad to an underlying substrate, and first and second shallow trenches extending from the upper surface of the top clad to the set of hard masks. The set of hard masks and the second hard mask layer are then removed. Reactive ion etching can be used to etch the first and second hard mask layers. The hard mask layers can be amorphous silicon.

In another embodiment, the present invention is implemented as a deep trench etching process wherein a passivation layer is formed over a top clad of an optical waveguide structure of a planar lightwave circuit and a hard mask layer is subsequently deposited over the passivation layer. In this embodiment, a single deep trench is etched as opposed to simultaneously etching a shallow trench and a deep trench. A trench area of the top clad is exposed by patterning and etching the hard mask layer. The trench area of the top clad is subsequently etched to form a deep trench in the waveguide structure extending from the upper surface of the top clad to an underlying substrate. Amorphous silicon is used for the hard mask.

In both embodiments, a reactive ion etching process or a wet etching process can be used to etch the deep trench. Due to the much higher selectivity of Si with respect to $SiO_2$, the hard mask layer protects adjacent areas of the top clad during the etch process. The hard mask is subsequently removed after etching the deep trench. The trench is disposed parallel to the optical core of the waveguide structure and is configured to both relieve stress and to thermally isolate the optical core. In this manner, the deep trench minimizes thermally induced dn/dt birefringence within thermal optic PLC devices and improves thermal isolation between adjacent thermal optic waveguides of an active PLC device. Both embodiments are compatible with widely used PLC fabrication methods.

BRIEF DESCRIPTION OF THE DRAWINGS

The present invention is illustrated by way of example and not by way of limitation, in the Figures of the accompanying drawings and in which like reference numerals refer to similar elements and in which.

DETAILED DESCRIPTION OF THE INVENTION

Reference will now be made in detail to the embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail as not to obscure aspects of the present invention unnecessarily.

The present invention is directed towards a deep trench etching process that minimizes thermally induced dn/dt birefringence within thermal optic PLC devices. The present invention provides a solution that improves thermal isolation between adjacent thermal optic waveguides of an active PLC device. Additionally, the process of the present invention is compatible with widely used PLC fabrication methods. The present invention and its benefits are further described below.

Figure 1:
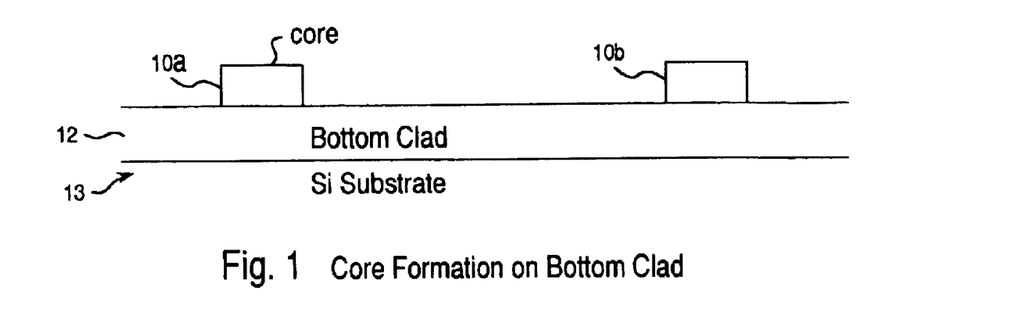
FIG. 1 shows a cross-section view of a PLC waveguide structure prior to top clad deposition.

FIG. 1 shows a cross-section view of a PLC waveguide structure 100. As depicted in FIG. 1, the waveguide structure 100 includes two doped $SiO_2$ glass cores 10a–b formed over a $SiO_2$ bottom cladding layer 12 which is on a silicon substrate 13. The refractive index of the cores 10a–b is higher than that of the cladding layer 12 in order to confine optical signals within cores 10a–b and propagate lengthwise through cores 10a–b. The SiO$_2$ cores 10a–b are typically doped with Ge or P to increase their refractive index. Substrate 13 is typically crystalline silicon.

The major steps of amorphous silicon and silicon dioxide deposition, photolithography, and fabrication are well known and widely used in planar lightwave circuit fabrication. Accordingly, such steps will not be described in extensive detail. Additionally, it should be noted that Figures are intended to be schematic to illustrate the principles of the present invention. As such, the dimensions depicted maybe exaggerated in order to illustrate aspects of the embodiments.

In fabricating waveguide structure 100, a bottom clad 12 is grown over substrate 13 using CVD process. An optical core layer is subsequently deposited over the bottom clad 12 wherein the optical core layer has a higher refractive index than bottom clad 12. The optical core layer can be a doped SiO$_2$ glass layer, as is known in the art. The optical core layer is then patterned, using well-known photolithography techniques, and etched to define the cores 10a–b.

Figure 2:
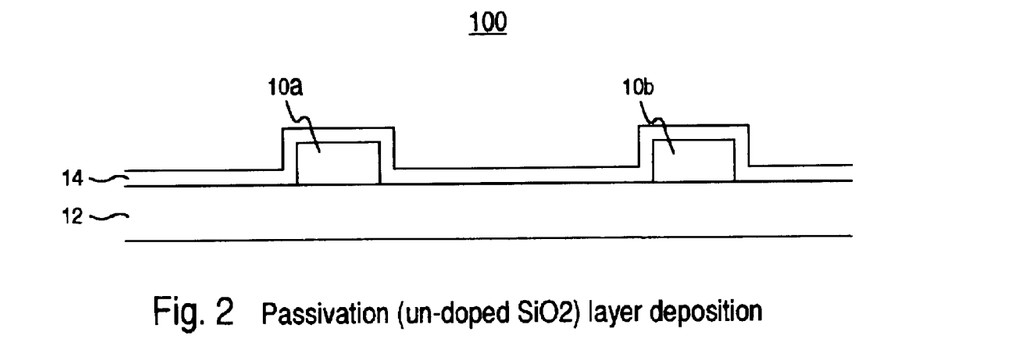
FIG. 2 shows the waveguide structure after a passivation layer is deposited across the waveguide cores and the bottom clad.

FIG. 2 shows the waveguide structure 100 after a passivation layer 14 is deposited. Passivation layer 14 is a layer of undoped SiO$_2$ for protecting the cores 10a–b.

Figure 3:
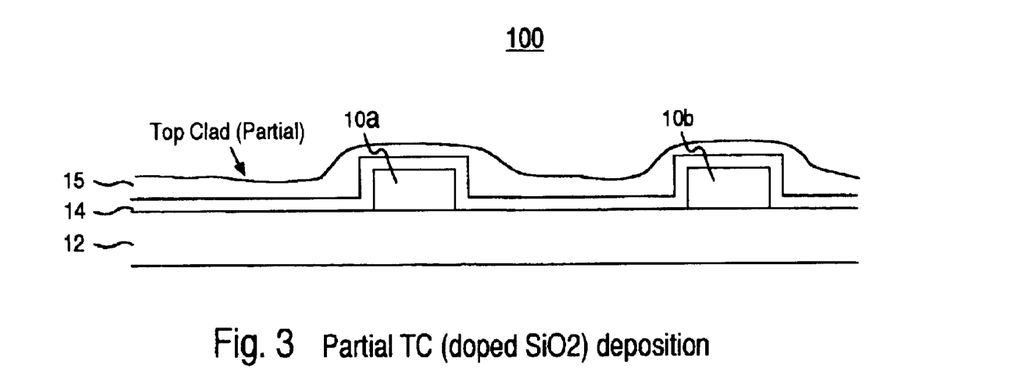
FIG. 3 shows a partial top clad deposition in accordance with one embodiment of the present invention.

FIG. 3 shows a partial top clad deposition. As depicted in FIG. 3, the next step in the process involves the partial deposition of top clad for the waveguide structure 100. A partial top clad layer 15 is deposited across the passivation layer 14 and the cores 10a–b. The partial top clad layer 15 can be a doped SiO$_2$ layer.

Figure 4:
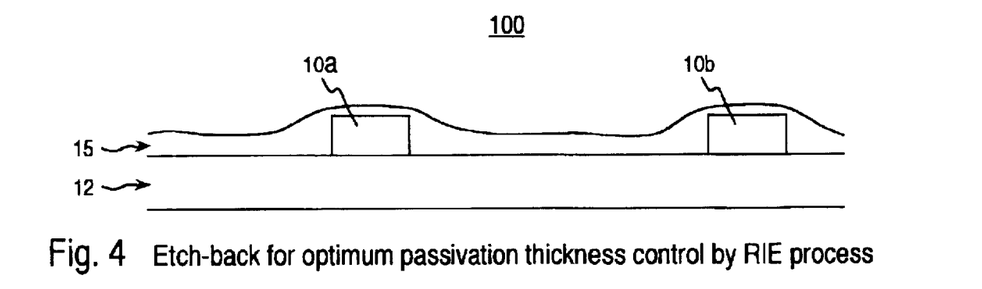
FIG. 4 shows the partial top clad layer after an etch back process to obtain an optimal thickness in accordance with one embodiment of the present invention.

FIG. 4 shows the partial top clad layer 15 after an etch back process to obtain an optimal thickness. As depicted in FIG. 4, the top clad layer 15 is subjected to a reactive ion etching process to reduce its thickness. This process is referred to as an etch back. After the etch back, the thickness of the top clad layer 15 over cores 10a–b and bottom clad 12 is at an optimal height.

Figure 5:
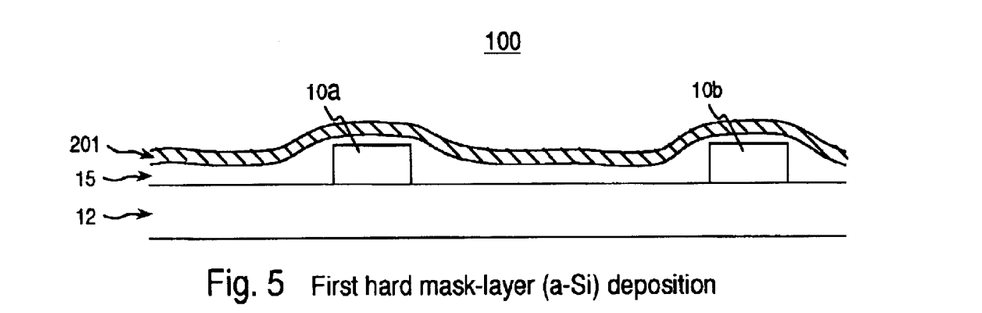
FIG. 5 shows waveguide structure after having a first hard mask layer deposited in accordance with one embodiment of the present invention.

FIG. 5 shows waveguide structure 100 after having a first hard mask layer 201 deposited. In this embodiment, the hard mask layer 201 is an amorphous silicon layer. As depicted in FIG. 5, the hard mask layer 201 is deposited across the entirety of the top clad 11 of the PLC, covering the surface of the partial top clad layer 15. A chemical vapor deposition (CVD) process can be used to deposit the hard mask layer 201.

Figure 6:
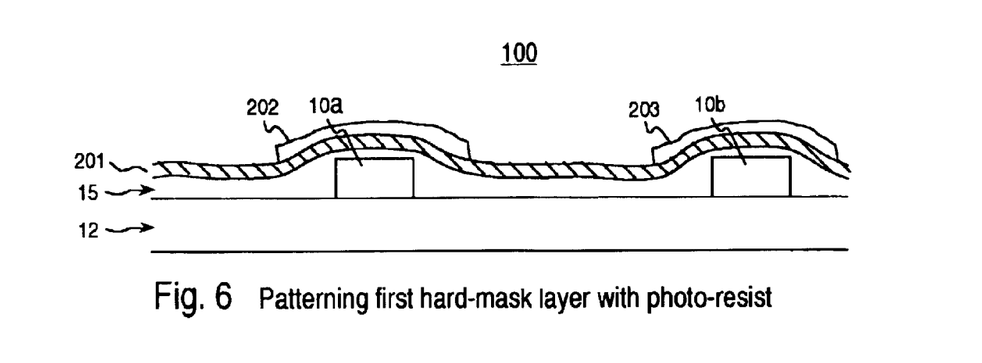
FIG. 6 shows the waveguide structure after a photoresist is deposited and patterned on the first hard mask layer in accordance with one embodiment of the present invention.

FIG. 6 shows the waveguide structure 100 after a photoresist is spun and patterned. Once the hard mask layer 201 is deposited, a photoresist layer is coated and patterned. Using standard photolithography techniques, photoresists 202 and 203 are formed on the hard mask layer 201.

Figure 7:
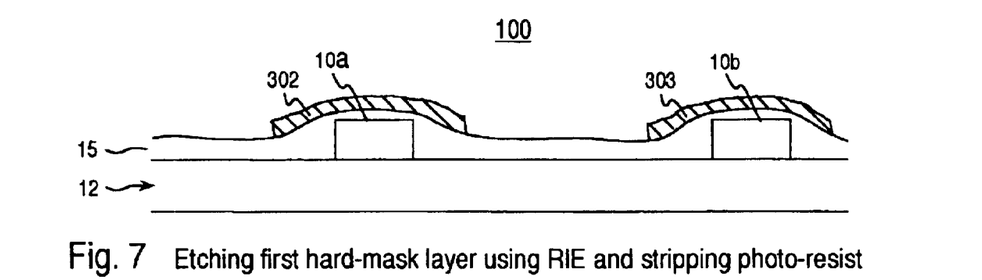
FIG. 7 shows hard masks and formed by patterning and etching the hard mask layer in accordance with one embodiment of the present invention.

FIG. 7 shows hard masks 302 and 303 formed by patterning and etching the hard mask layer 201. FIG. 7 shows the waveguide structure 100 after etching away the exposed areas, and the stripping of photoresists 202 and 203. In this embodiment, the hard masks 302–303 are formed directly over cores 10a–b on the surface of the partial top clad layer 15. In this embodiment, the hard masks 302 and 303 are formed by reactive ion etching the exposed areas of the hard mask layer 201. A reactive ion etching process is more advantageous in comparison to wet etching in that reactive ion etching has much better width control of the structure, consumes much less toxic/hazardous materials, and is easier to work with, in comparison to wet etch chemicals and processing techniques.

Figure 8:
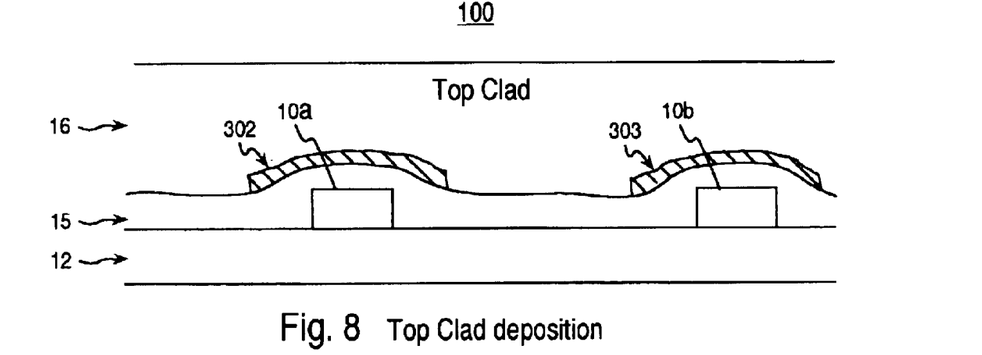
FIG. 8 shows the waveguide structure after the deposition of a full top clad layer over the partial top clad layer and the hard masks in accordance with one embodiment of the present invention.

FIG. 8 shows the waveguide structure 100 after the deposition of a full top clad layer 16 over the partial top clad layer 15 and the hard masks 302–303. Once the hard masks 302–303 have been formed at the proper height above cores 10a–b, the full top clad layer 16 can be deposited. In this embodiment, a plasma enhanced chemical vapor deposition (PECVD) process can be used to deposit the top clad layer 16.

Figure 9:
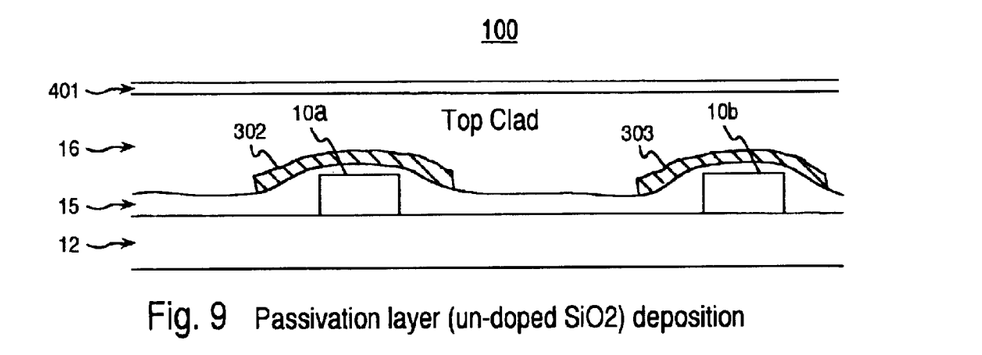
FIG. 9 shows the waveguide structure after a passivation layer is deposited.

FIG. 9 shows the waveguide structure 100 after a passivation layer 401 is deposited. As described above in FIG. 2, passivation layer 401 is a layer of undoped SiO$_2$ for protecting the top clad layer 16.

Figure 10:
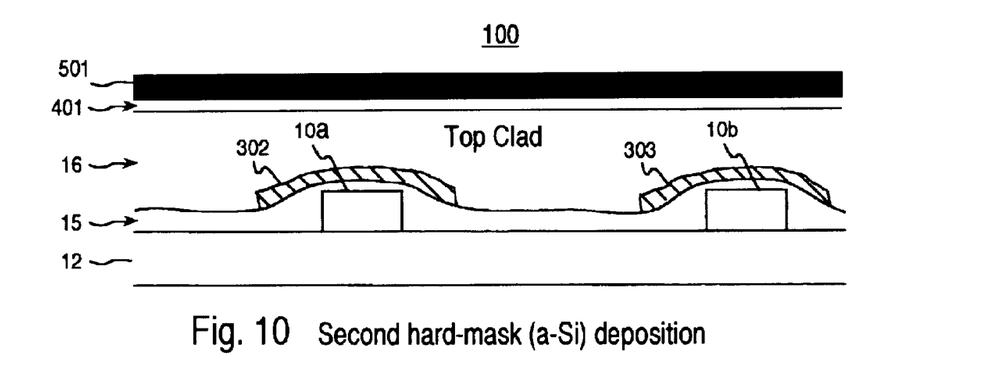
FIG. 10 shows the waveguide structure after the deposition of the second hard mask layer in accordance with one embodiment of the present invention.

FIG. 10 shows the waveguide structure 100 after the deposition of the second hard mask layer 501. In this embodiment, the hard mask layer 501 is an amorphous silicon layer, and the same manner as hard mask layer 201 of FIG. 5. As depicted in FIG. 10, the hard mask layer 501 is deposited across the entirety of the top clad layer 16 and the passivation layer 401 of the PLC. A chemical vapor deposition (CVD) process can be used to deposit the hard mask layer 501.

Figure 11:
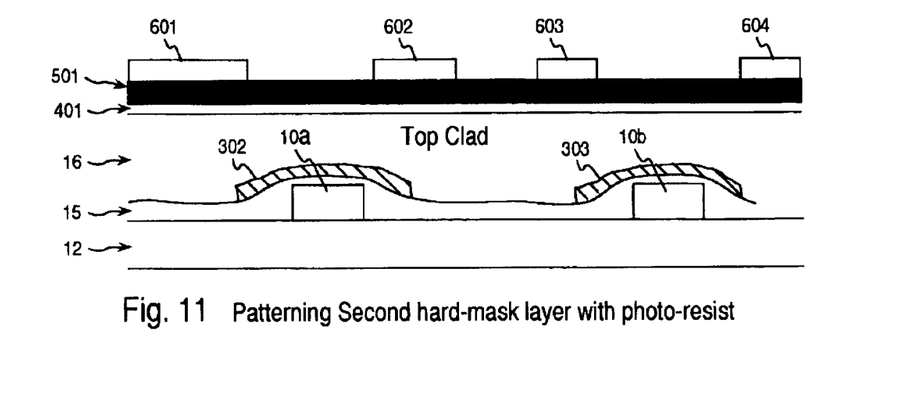
FIG. 11 shows the waveguide structure after the deposition and patterning of a photoresist layer in accordance with one embodiment of the present invention.

FIG. 11 shows the waveguide structure 100 after the coat and patterning of a photoresist layer. After patterning a photoresist layer, photoresists 601–604 are formed on the surface of hard mask layer 501.

Figure 12:
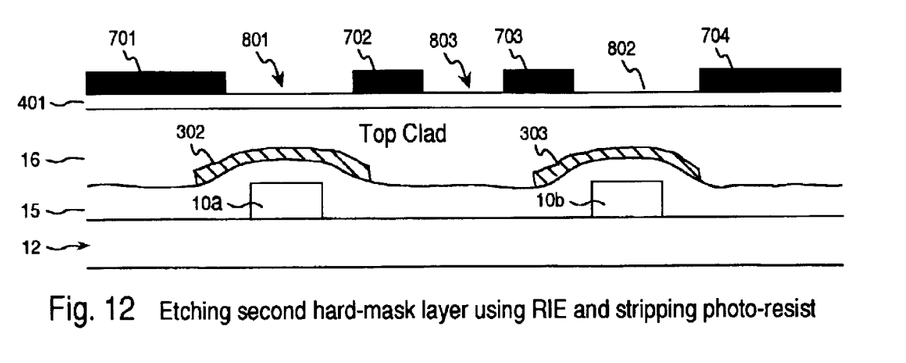
FIG. 12 shows the waveguide structure after the exposed areas of hard mask layer are etched away.

FIG. 12 shows the waveguide structure 100 after the exposed areas of hard mask layer 501 are etched away. The removal of the exposed areas of hard mask layer 501 leaves the hard masks 701–704. In this embodiment, the hard masks 701–704 are formed by reactive ion etching the exposed areas of the hard mask layer 501.

Thus, this step leaves three unprotected areas of waveguide structure 100, two shallow trench areas 801 and 802 and a deep trench area 803. As depicted in FIG. 12, the shallow trench areas 801–802 are directly above cores 10a–b. The deep trench area 803 is disposed between cores 10a–b as shown.

Figure 13:
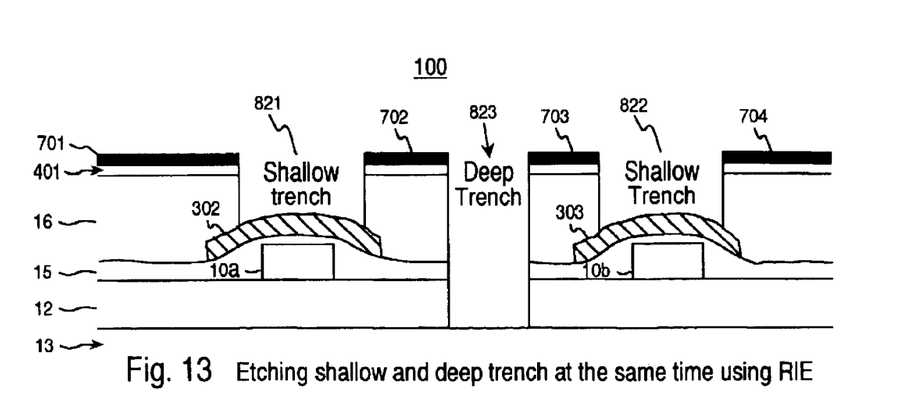
FIG. 13 shows waveguide structure after a first deep trench and a second shallow trench in accordance with one embodiment of the present invention are etched into the waveguide structure.

FIG. 13 shows waveguide structure 100 after a first deep trench 823 and two shallow trenches 821 and 822 are etched into waveguide structure 100. A first deep trench 823 and shallow trenches 821–822 are formed by a prolonged etching of the trench areas (e.g., areas 801–803) of the passivation layer 401 to form a deep trench 823 extending from passivation layer 415 and the upper surface of the top clad 11 to the underlying substrate 13 and shallow trenches 821–822 extending from the passivation layer 415 and the upper surface of the top clad 11 to the hard masks 302–303.

Thus in this step, a single etch process can create a very deep trench 823 and two shallow trenches 821 and a 822 simultaneously. The shallow trenches 821–822 use the hard mask layers 302–303 to stop the etch process from proceeding too deeply. In contrast, the exposed trench area 803 (shown in FIG. 12) is aggressively attacked by the etching process and is not stopped until the crystalline silicon substrate 13 is reached, thus forming deep trench 823.

The present invention utilizes the fact that the amorphous silicon hard masks 701–704 and 302–303 show a much higher selectivity to a reactive ion etching process of the present invention than passivation layer 401 and the silica glass layers of top clad layers 16–17 and bottom clad 12. Although the amorphous silicon hard masks 302–303 can be somewhat eroded by the etching process, the depth of shallow trenches 821–822 is much less than that of the deep trench 823. This same selectivity is utilized when the etching process is a wet etching process instead of a reactive ion etching process.

Figure 14:
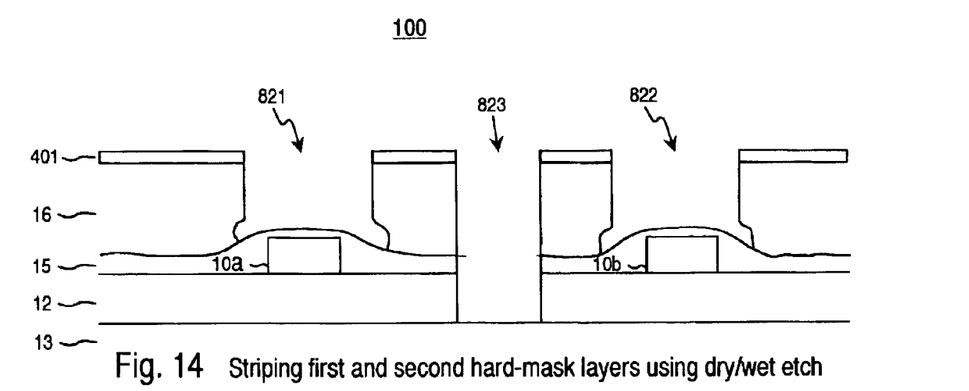
FIG. 14 shows the finished waveguide structure after removal of the hard masks from the bottom of shallow trenches and the removal of the hard masks from the surface of the passivation layer (e.g. amorphous silicon strip).

FIG. 14 shows the finished waveguide structure 100 after removal of the hard masks 302–303 from the bottom of shallow trenches 821–822 and the removal of the hard masks 701–704 from the surface of the passivation layer 401 (e.g. amorphous silicon strip). Thus, cores 10a–b have parallel shallow trenches 821–822 disposed directly above to relieve stress. Additionally, cores 10a–b have a parallel deep trench 823 to also relieve stress, and also thermally isolate cores 10a–b from, for example, heat sources to the right of the deep trench 823. Trenches 821 and 822 can relieve an intrinsic stress within waveguide structure 100 (e.g., stress within the top clad 11, core 10, bottom clad 12, etc.) due to, for example, differing coefficients of expansion. The trenches can also relieve a thermally induced stress within the top clad layers due to, for example, a heat source for modulating the phase of light propagating through cores 10a–b.

It should be noted that deep trench 823 can be 30 microns deep from the surface of the passivation layer 401 to the bottom of deep trench 823 in substrate 13. This is a much deeper etch than that of the shallow trenches 821–822.

Figure 15:
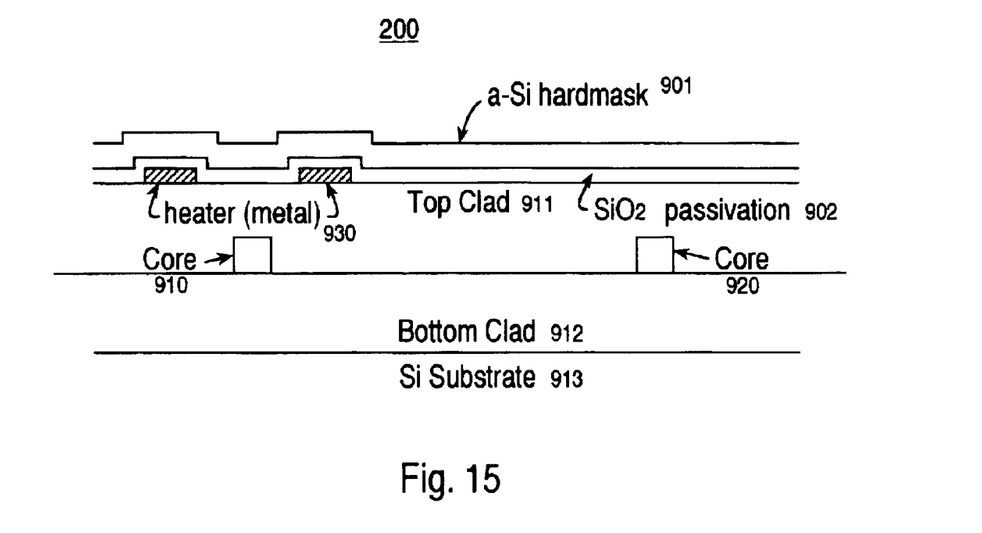
FIG. 15 shows a waveguide structure in accordance with a second embodiment of the present invention.

FIG. 15 shows a waveguide structure 200 in accordance with a second embodiment of the present invention. In this embodiment, the present invention is implemented as a deep trench etch process where a passivation layer is formed over a top clad and a metal layer prior to the deposition of the hard mask layer. As depicted in FIG. 15, two waveguide cores are shown, core 910 and core 920. Metal heaters 930 are disposed above waveguide core 910 on the surface of the top clad 911. A bottom clad 912 and a substrate 913 lie beneath the top clad 911 and cores 910 and 920. In this embodiment, a passivation layer 902 is formed over the heaters 930. Then a hard mask layer 901 is deposited over the passivation layer 902.

Figure 16:
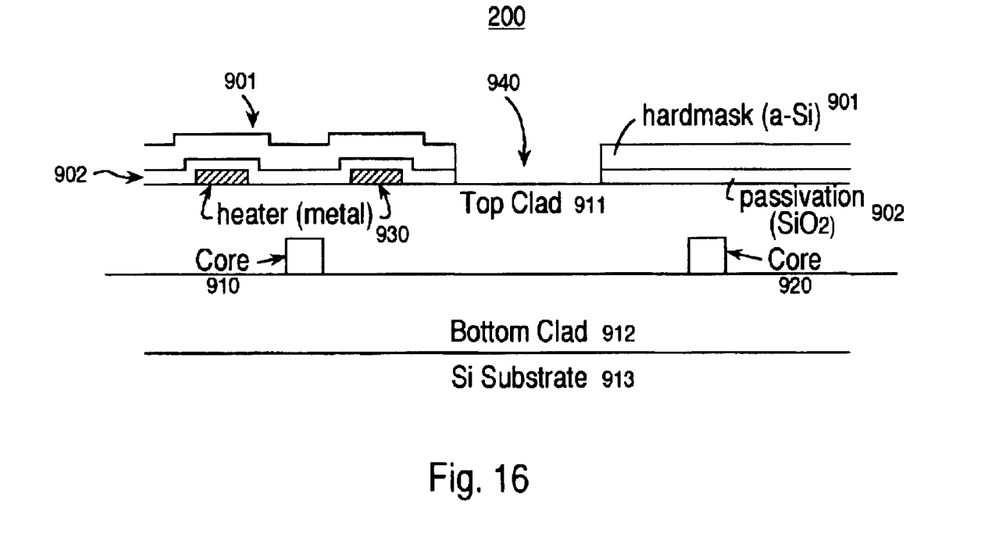
FIG. 16 shows the waveguide structure from FIG. 15 after patterning and etching of the hard mask layer in accordance with one embodiment of the present invention.

FIG. 16 shows the waveguide structure 200 after patterning and etching of the hard mask layer 901. The hard mask layer 901 is patterned and etched to expose a trench area 940.

Figure 17:
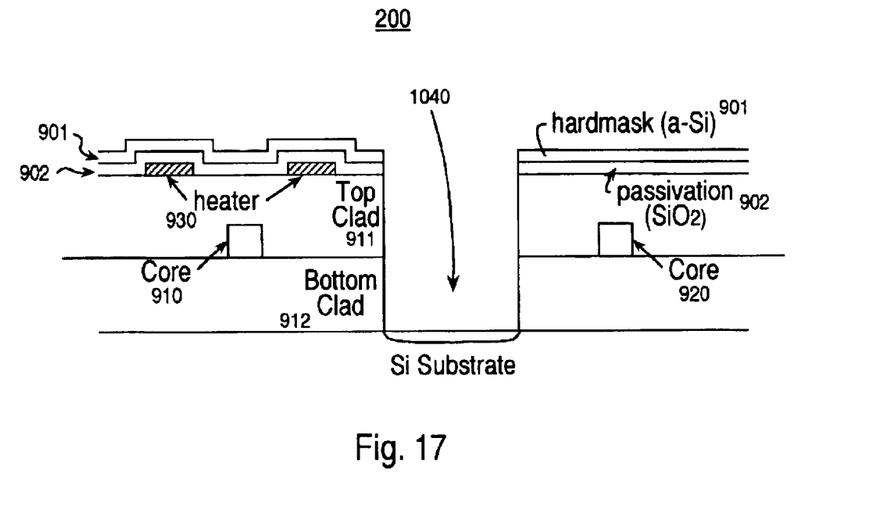
FIG. 17 shows the waveguide structure after a deep trench is etched in accordance with one embodiment of the present invention.

FIG. 17 shows the waveguide structure 200 after a deep trench 1040 is etched. In this embodiment, a single trench is etched at one time. The hard mask 901 protects the adjacent areas of the top clad 911 during the etching process.

Figure 18:
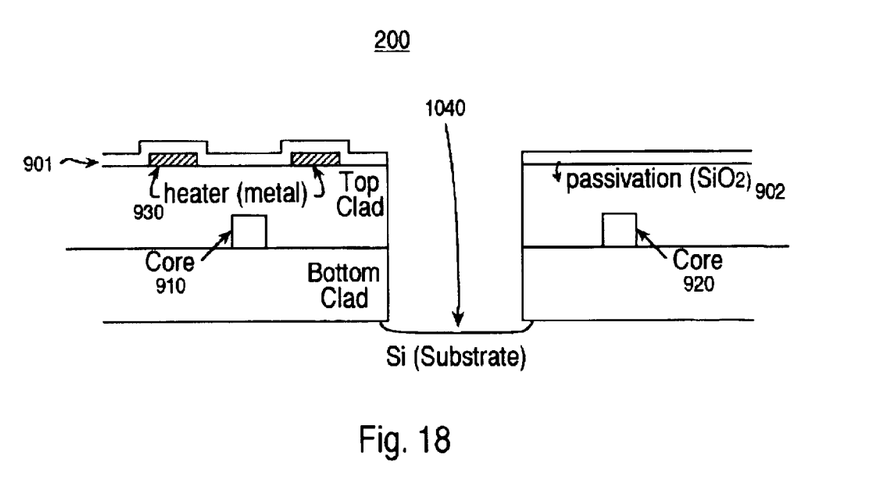
FIG. 18 shows the waveguide structure after the removal of the hard mask in accordance with one embodiment of the present invention.

FIG. 18 shows the waveguide structure 200 after the removal of the hard mask. Trench 1040 thus functions by thermally isolating core 910 from core 920. Thus, in the case where waveguide structure 200 is used to implement a Mach-Zehnder attenuator, a trench 1040 will prevent thermal energy from core 910 (heat transmitted from heaters 930) from interfering with core 920.

Thus, the present invention provides a solution that minimizes thermally induced dn/dt birefringence within thermal optic PLC devices. The present invention provides a solution that improves thermal isolation between adjacent thermal optic waveguides of an active PLC device. Additionally, the process of the present invention is compatible with widely used PLC fabrication methods.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order best to explain the principles of the invention and its practical application, thereby to enable others skilled in the art best to utilize the invention and various embodiments with various modifications as are suited to the particular use contemplated. It is intended that the scope of the invention be defined by the claims appended hereto and their equivalents.

What is claimed is:

1. A method of making an optical waveguide structure having improved thermal isolation and stress reduction, the method comprising the steps of:

a) depositing a partial top clad layer over a first and second waveguide core;

b) performing an etch back on the partial top clad layer to obtain a desired thickness of the partial top clad layer;

c) depositing a first hard mask layer over the partial top clad layer;

d) forming first hard masks over the first and second waveguide cores by patterning and etching the first hard mask layer;

e) depositing a full top clad layer over the partial top clad layer and the first hard masks to form a top clad for the optical waveguide structure;

f) depositing a second hard mask layer over the top clad;

g) exposing a deep trench area and first and second shallow trench areas of the top clad by patterning and etching the second hard mask layer; and h) etching simultaneously the deep trench area of the top clad to form a deep trench extending from the upper surface of the top clad to an underlying substrate, and the first and second shallow trench areas of the full top clad layer to form first and second shallow trenches extending from the upper surface of the top clad to the first hard masks.

2. The method of claim 1 further comprising the step of removing the first hard masks and the second hard mask layer after etching the trench areas to form the shallow trenches and the deep trench.

3. The method of claim 1 further comprising the step of using reactive ion etching to etch the first and second hard mask layers.

4. The method of claim 1 further comprising the step of using reactive ion etching to etch the trench areas of the top clad to form the shallow trenches and the deep trench.

5. The method of claim 1 further comprising the step of using a wet etch process to etch the trench areas of the top clad to form the shallow trenches and the deep trench.

6. The method of claim 1 wherein the first and second hard mask layers are amorphous silicon.

7. The method of claim 1 wherein the deep trench is disposed parallel and between the optical cores of the waveguide structure and is configured to relieve a stress on the optical cores.

8. The method of claim 1 wherein the first and second shallow trenches are disposed parallel to and directly above the optical cores and are configured to relieve a stress on the optical cores.

9. The method of claim 1 wherein the deep trench is disposed parallel to and between the optical cores of the waveguide structure and is configured to thermally isolate the optical cores.

* * * * *